United States Patent
Tsuda

(10) Patent No.: US 10,911,636 B2
(45) Date of Patent: Feb. 2, 2021

(54) IMAGE INCLINATION ANGLE DETECTION APPARATUS THAT DETECTS INCLINATION ANGLE OF IMAGE WITH RESPECT TO DOCUMENT, IMAGE FORMING APPARATUS, AND COMPUTER-READABLE NON-TRANSITORY RECORDING MEDIUM STORING IMAGE INCLINATION ANGLE DETECTION PROGRAM

(71) Applicant: KYOCERA Document Solutions Inc., Osaka (JP)

(72) Inventor: Mineyuki Tsuda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/801,862

(22) Filed: Feb. 26, 2020

(65) Prior Publication Data
US 2020/0288040 A1    Sep. 10, 2020

(30) Foreign Application Priority Data
Mar. 4, 2019 (JP) ................................ 2019-038835

(51) Int. Cl.
*H04N 1/38* (2006.01)
*H04N 1/387* (2006.01)
(Continued)

(52) U.S. Cl.
CPC ......... *H04N 1/3878* (2013.01); *G06K 9/6218* (2013.01); *H04N 1/40093* (2013.01); *G06K 9/4609* (2013.01); *G06K 2209/01* (2013.01); *H04N 1/00005* (2013.01); *H04N 1/00034* (2013.01); *H04N 1/00816* (2013.01)

(58) Field of Classification Search
CPC combination set(s) only.
See application file for complete search history.

(56) References Cited

U.S. PATENT DOCUMENTS 5,398,293 A * 3/1995 Sato .................... H04N 1/40093
                                                      358/452
5,517,587 A * 5/1996 Baker .................. G06K 9/3283
                                                      235/462.1
2011/0310414 A1    12/2011 Morimoto et al.

FOREIGN PATENT DOCUMENTS

JP      2012-005062 A     1/2012
JP      2014-230119 A    12/2014

* cited by examiner

*Primary Examiner* — Barbara D Reinier
(74) *Attorney, Agent, or Firm* — IP Business Solutions, LLC

(57) ABSTRACT

A control device sets first points on characters, generates a first frame composed of a first point and first circles, attaches first marks to points at which the first circles intersect characters, detects a range having a largest central angle and no first marks, sets second points on the first circles in the detected region, generates a second frame composed of a second point and second circles, attaches second marks to points at which the second circles intersect characters, sets a direction passing through the center portions of ranges having no second marks and the second point, sets second points arranged in the direction as the same class, calculates an approximate line connecting second points for each class, obtains straight lines indicating a row direction of characters immediately above and below an approximate line, and determines an inclination angle of an image from inclinations of the straight lines.

13 Claims, 20 Drawing Sheets

(51) Int. Cl.
*H04N 1/40* (2006.01)
*G06K 9/62* (2006.01)
*H04N 1/00* (2006.01)
*G06K 9/46* (2006.01)

Fig.18

| STRAIGHT LINE | CLASS LENGTH | ESTIMATED ANGLE |
|---|---|---|
| L101 | 398.00 | 3.95 |
| L102 | 395.00 | 3.92 |
| L103 | 427.26 | 4.08 |
| L104 | 427.26 | 4.18 |
| L105 | 181.85 | 4.48 |
| ⋮ | ⋮ | ⋮ |

Fig.20

| IMAGE NAME | +4° | | +3° | | +2° | | +1° | |
|---|---|---|---|---|---|---|---|---|
| | CALCULATION RESULT | ERROR | CALCULATION RESULT | ERROR | CALCULATION RESULT | ERROR | CALCULATION RESULT | ERROR |
| ENGLISH TEXT 1 | 4.09 | -0.09 | 3.08 | -0.08 | 2.06 | -0.06 | 0.96 | 0.04 |
| ENGLISH TEXT 2 | 3.94 | 0.06 | 2.85 | 0.15 | 1.96 | 0.04 | 1.04 | -0.04 |
| ENGLISH TEXT 3 | 3.90 | 0.10 | 2.94 | 0.06 | 1.96 | 0.04 | 0.94 | 0.06 |
| JAPANESE TEXT 1 | 4.00 | 0.00 | 2.93 | 0.07 | 1.96 | 0.04 | 0.96 | 0.04 |
| JAPANESE TEXT 2 | 3.97 | 0.03 | 3.07 | -0.07 | 2.02 | -0.02 | 0.99 | 0.01 |
| JAPANESE TEXT 3 | 3.83 | 0.17 | 2.94 | 0.06 | 1.96 | 0.04 | 3.83 | 0.15 |

| 0° | | -1° | | -2° | | -3° | | -4° | |
|---|---|---|---|---|---|---|---|---|---|
| CALCULATION RESULT | ERROR | CALCULATION RESULT | ERROR | CALCULATION RESULT | ERROR | CALCULATION RESULT | ERROR | CALCULATION RESULT | ERROR |
| -0.05 | 0.05 | -1.09 | 0.09 | -1.97 | -0.03 | -3.01 | 0.01 | -4.06 | 0.06 |
| -0.04 | 0.04 | -1.00 | 0.00 | -2.04 | 0.04 | -2.93 | -0.07 | -3.99 | -0.01 |
| -0.06 | 0.06 | -0.96 | -0.04 | -1.92 | -0.08 | -3.03 | 0.03 | -3.96 | -0.04 |
| -0.19 | 0.19 | -1.11 | 0.11 | -1.97 | -0.03 | -3.05 | 0.05 | -3.90 | -0.10 |
| -0.01 | 0.01 | -1.00 | 0.00 | -2.04 | 0.04 | -3.02 | 0.02 | -4.00 | 0.00 |
| -0.09 | 0.09 | -1.08 | 0.08 | -1.96 | -0.04 | -2.89 | -0.11 | -4.00 | 0.00 |

IMAGE INCLINATION ANGLE DETECTION APPARATUS THAT DETECTS INCLINATION ANGLE OF IMAGE WITH RESPECT TO DOCUMENT, IMAGE FORMING APPARATUS, AND COMPUTER-READABLE NON-TRANSITORY RECORDING MEDIUM STORING IMAGE INCLINATION ANGLE DETECTION PROGRAM

INCORPORATION BY REFERENCE

This application claims priority to Japanese Patent Application No. 2019-038835, filed on 4 Mar. 2019, the entire contents of which are incorporated by reference herein.

BACKGROUND

The present disclosure relates to an apparatus that detects an inclination angle of an image and a computer-readable non-transitory recording medium storing a program for detecting an inclination angle of an image.

When having a document be read by an image reading apparatus such as a scanner, sometimes content of the document is read slantwise due to the way the document is placed. Since print quality is deteriorated when printing is performed on the basis of a document image read slantwise, it is desirable to detect an inclination angle to correct the direction of the document image and perform printing using the corrected image. It is necessary to accurately ascertain the range of a document (content) to correct the direction of a document image. To do so, the inclination angle of the image is necessary.

As a first general method for obtaining inclination of an image, there is a known method in which a regression line is obtained by using as an input coordinates of an edge pixel of the upper end of each character by the least squares method and the inclination of the line is used as the inclination angle of the image.

As a second general method for obtaining inclination of an image, there is a known method of creating an image where the surroundings of character pixels are expanded and filled with a character color, performing processing of extracting edges from the image, performing thinning processing, and estimating the inclination of the document image from the extracted straight lines.

SUMMARY

As one aspect of the present disclosure, a technology improved over the above-described technology is proposed.

An image inclination angle detection apparatus according to one aspect of the present disclosure includes an image reading device and a control device. The image reading device reads an image of a document. The control device includes a processor and functions, through the processor executing an image inclination angle detection program, as a first search point setting device, a first search frame generator, a first marking device, a line space region detector, a second search point setting device, a second search frame generator, a second marking device, a line space direction setting device, a clustering device, an approximate straight line calculator, a row direction calculator, and an inclination angle determination device. The first search point setting device detects a plurality of characters included in the image acquired through document reading performed by the image reading device and sets a first search point at a point on each of the characters. The first search frame generator sets, with respect to each first search point set by the first search point setting device, a plurality of first search circles with different diameters having the first search point as a center and generates a first search frame composed of the first search point, which is the center of the plurality of first search circles, and the plurality of first search circles. The first marking device attaches first marks to points at which the plurality of first search circles intersect the characters included in the image in each first search frame generated by the first search frame generator. The line space region detector extracts, in each first search frame, ranges having no first marks when viewed from the first search point, which is the center of the first search circles, in the form of fan shapes and detects a range having a largest central angle as a region present in a line space. The second search point setting device sets second search points on any of the plurality of first search circles in the region detected by the line space region detector in each first search frame. The second search frame generator sets, with respect to each second search point set by the second search point setting device, a plurality of second search circles with different diameters having the second search point as a center and generates a second search frame composed of the second search point and the plurality of second search circles. The second marking device attaches second marks to points at which the second search circles intersect the characters included in the image in each second search frame generated by the second search frame generator. The line space direction setting device extracts, in each second search frame, ranges having no second marks when viewed from the second search point, which is the center of the plurality of second search circles, in the form of fan shapes and sets, as a line space direction, a direction in which a straight line passing through the center portions of the ranges and the second search point extends. The clustering device performs clustering by which the second search points of the second search frames arranged in the line space direction set by the line space direction setting device are set as a same class. The approximate straight line calculator calculates, for each class set by the clustering device, an approximate straight line connecting the second search points of the second search frames in the class. The row direction calculator, for each approximate line calculated by the approximate straight line calculator, obtains, based on positions of all pixels of characters overlapping with the second search circles from among a plurality of characters positioned immediately above the approximate line, a straight line indicating a direction of a row composed of the plurality of characters positioned immediately above the approximate line and further obtains, based on positions of all pixels of characters overlapping with the second search circles from among a plurality of characters positioned immediately below the approximate line, a straight line indicating a direction of a row composed of the plurality of characters positioned immediately below the approximate line. The inclination angle determination device determines, from inclinations of respective straight lines indicating the directions of the rows calculated by the row direction calculator, an inclination angle of the image with respect to the document, the image being acquired through document reading performed by the image reading device.

An image forming apparatus according to another aspect of the present disclosure includes the aforementioned image inclination angle detection apparatus and an image forming device. The image forming device performs image formation on a recording medium using an image read by the image reading device.

A computer-readable non-transitory recording medium according to another aspect of the present disclosure stores an image inclination angle detection program causing a computer to function as a first search point setting device, a first search frame generator, a first marking device, a line space region detector, a second search point setting device, a second search frame generator, a second marking device, a line space direction setting device, a clustering device, an approximate straight line calculator, a row direction calculator, and an inclination angle determination device. The first search point setting device detects a plurality of characters included in an image acquired through document reading performed by an image reading device and sets a first search point at a point on each of the characters. The first search frame generator sets, with respect to each first search point set by the first search point setting device, a plurality of first search circles with different diameters having the first search point as a center and generates a first search frame composed of the first search point, which is the center of the plurality of first search circles, and the plurality of first search circles. The first marking device attaches first marks to points at which the plurality of first search circles intersect the characters included in the image in each first search frame generated by the first search frame generator. The line space region detector extracts, in each first search frame, ranges having no first marks when viewed from the first search point, which is the center of the first search circles, in the form of fan shapes and detects a range having a largest central angle as a region present in a line space. The second search point setting device sets second search points on any of the plurality of first search circles in the region detected by the line space region detector in each first search frame. The second search frame generator sets, with respect to each second search point set by the second search point setting device, a plurality of second search circles with different diameters having the second search point as a center and generates a second search frame composed of the second search point and the plurality of second search circles. The second marking device attaches second marks to points at which the second search circles intersect the characters included in the image in each second search frame generated by the second search frame generator. The line space direction setting device extracts, in each second search frame, ranges having no second marks when viewed from the second search point, which is the center of the plurality of second search circles in the form of fan shapes and sets, as a line space direction, a direction in which a straight line passing through the center portions of the ranges and the second search point extends. The clustering device performs clustering by which the second search points of the second search frames arranged in the line space direction set by the line space direction setting device are set as a same class. The approximate straight line calculator calculates, for each class set by the clustering device, an approximate straight line connecting the second search points of the second search frames in the class. The row direction calculator, for each approximate line calculated by the approximate straight line calculator, obtains, based on positions of all pixels of characters overlapping with the second search circles from among a plurality of characters positioned immediately above the approximate line, a straight line indicating a direction of a row composed of the plurality of characters positioned immediately above the approximate line and further obtains, based on positions of all pixels of characters overlapping with the second search circles from among a plurality of characters positioned immediately below the approximate line, a straight line indicating a direction of a row composed of the plurality of characters positioned immediately below the approximate line. The inclination angle determination device determines, from inclinations of respective straight lines indicating the directions of the rows calculated by the row direction calculator, an inclination angle of the image with respect to the document, the image being acquired through document reading performed by the image reading device.

BRIEF DESCRIPTION OF THE DRAWINGS

FIG. 18 is a diagram showing information about the straight lines shown in FIG. 17.

FIG. 20 is a diagram showing obtained results of image inclination angles.

DETAILED DESCRIPTION

<1. Configuration>

Hereinafter, an image inclination angle detection apparatus, an image forming apparatus, and an image inclination angle detection program according to an embodiment of the present disclosure will be described with reference to the drawings.

Figure 1:
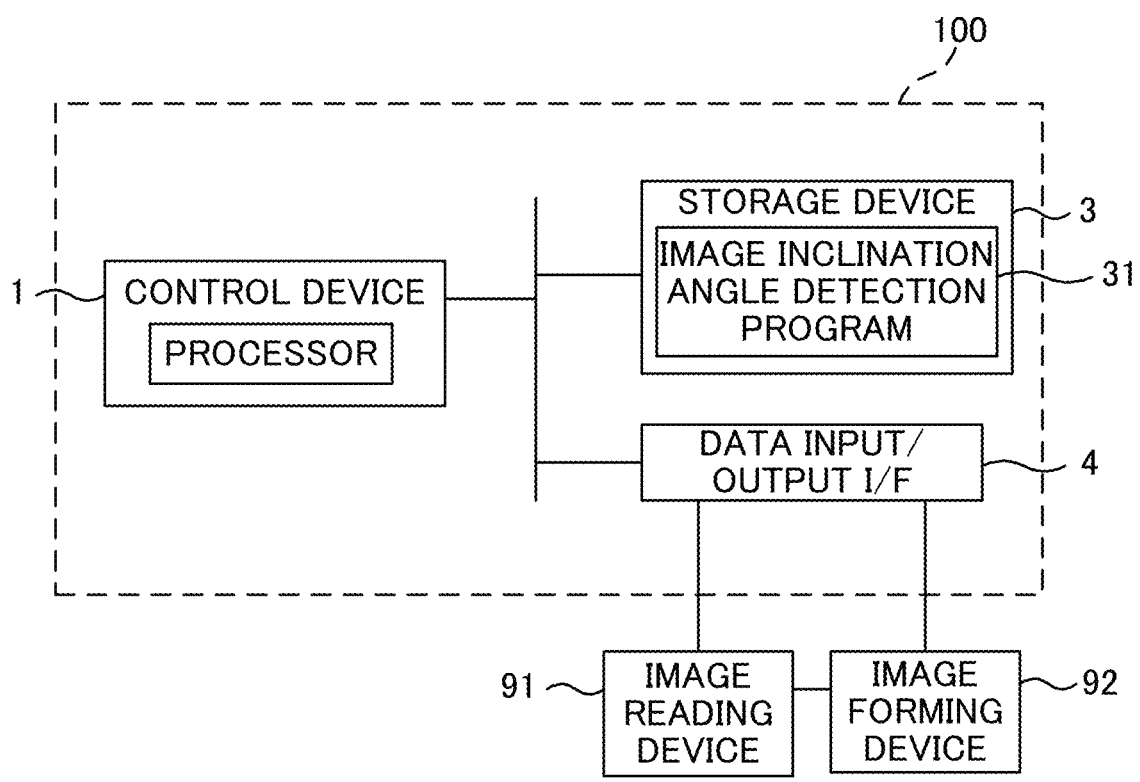
FIG. 1 is a block diagram briefly showing an internal configuration of an image inclination angle detection apparatus.
Figure 2:
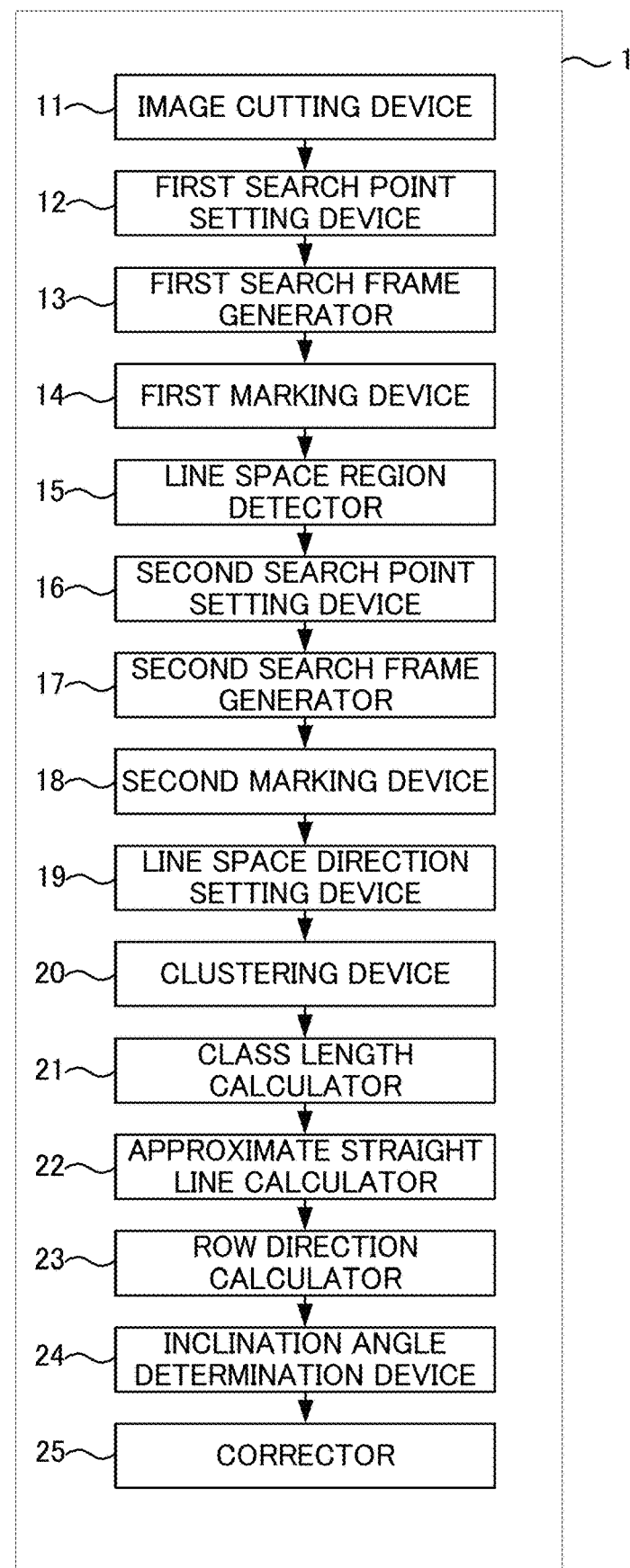
FIG. 2 is a block diagram showing a detailed functional configuration of the image inclination angle detection apparatus.

FIG. 1 is a diagram briefly showing an internal configuration of an image inclination angle detection apparatus 100 according to an embodiment of the present disclosure. FIG. 2 is a block diagram showing a detailed functional configuration of the image inclination angle detection apparatus 100. The image inclination angle detection apparatus 100 can be realized using a general-purpose computer or the like.

As shown in FIG. 1, the image inclination angle detection apparatus 100 includes a control device 1, a storage device 3 which stores an image inclination angle detection program 31 and various types of data, a data input/output interface (I/F) 4 for performing data communication with an external device, and an image reading device 91. The image inclination angle detection apparatus 100 is connected to an image forming device 92 through the data input/output I/F 4. An apparatus including the image inclination angle detection apparatus 100 and the image forming device 92 constitute an image forming apparatus.

The control device 1 is composed of a processor, a random access memory (RAM), a read only memory (ROM), and the like. The processor is, for example, a central processing unit (CPU), an application specific integrated circuit (ASIC), a micro-processing unit (MPU), or the like. The control device 1 functions, through the processor executing the image inclination angle detection program 31 stored in the storage device 3, as an image cutting device 11, a first search point setting device 12, a first search frame generator 13, a first marking device 14, a line space region detector 15, a second search point setting device 16, a second search frame generator 17, a second marking device 18, a line space direction setting device 19, a clustering device 20, a class length calculator 21, an approximate straight line calculator 22, a row direction calculator 23, an inclination angle determination device 24, and a corrector 25. Meanwhile, the aforementioned components may each be configured as hardware circuits without depending on operations based on the image inclination angle detection program 31.

The image reading device 91 is a scanner mechanism or the like, for example, and reads an image from a document to generate image data. The image forming device 92 is an electrographic image forming mechanism, for example, and prints an image on paper on the basis of image data acquired by the image reading device 91 through document reading. In the present embodiment, when an image represented by image data acquired by the image reading device 91 is inclined, the corrector 25 of the control device 1 acquires information on the inclination angle from the inclination angle determination device 24 and corrects the inclination of the image using the acquired information on the inclination angle. The image forming device 92 acquires the image with inclination corrected through processing of the corrector 25 from the image inclination angle detection apparatus 100 and prints the image on paper.

The image cutting device 11 to the inclination angle determination device 24 perform the following processing.

The image cutting device 11 cuts an image having a predetermined size out of an image represented by image data acquired through document reading performed by the image reading device 91 as a cut image. The first search point setting device 12 sets, for a plurality of characters included the cut image cut by the image cutting device 11, a first search point at a point on each of the characters. The first search frame generator 13 sets a plurality of first search circles with different diameters having the first search point as a center with respect to each first search point and generates a first search frame composed of the first search point and the plurality of first search circles. The first marking device 14 attaches first marks to points at which the plurality of first search circles intersect characters included in the cut image to mark the points in each first search frame generated by the first search frame generator 13. The line space region detector 15 detects a region in which a line space is present.

The second search point setting device 16 sets a second search point on any of the plurality of first search circles which is a region detected by the line space region detector 15 in each first search frame. The second search frame generator 17 sets a group of second search circles with different diameters having the second search point as a center in each first search frame with respect to each second search point set by the second search point setting device 16 and generates a second search frame composed of the second search point and the plurality of second search circles. The second marking device 18 attaches second marks to points at which the plurality of second search circles intersect characters included in the cut image to mark the points in each second search frame generated by the second search frame generator 17. The line space direction setting device 19 sets a line space direction using a marking result of the second marks obtained by the second marking device 18.

The clustering device 20 performs clustering of second search points using the coordinates (positions) of the second search points and the line space direction set by the line space direction setting device 19. The class length calculator 21 calculates the length of each class. The approximate straight line calculator 22 calculates an approximate straight line indicating a row direction for each class set by the clustering device 20. The row direction calculator 23 performs principal component analysis on all pixels constituting characters which intersect second search circles from among characters present above and below the calculated approximate straight line to obtain a straight line. The inclination angle determination device 24 determines an inclination angle of the image acquired through document reading performed by the image reading device 91 with respect to the document from an inclination angle of the straight line obtained by the row direction calculator 23.

<2. Processing Flow>

Figure 3:
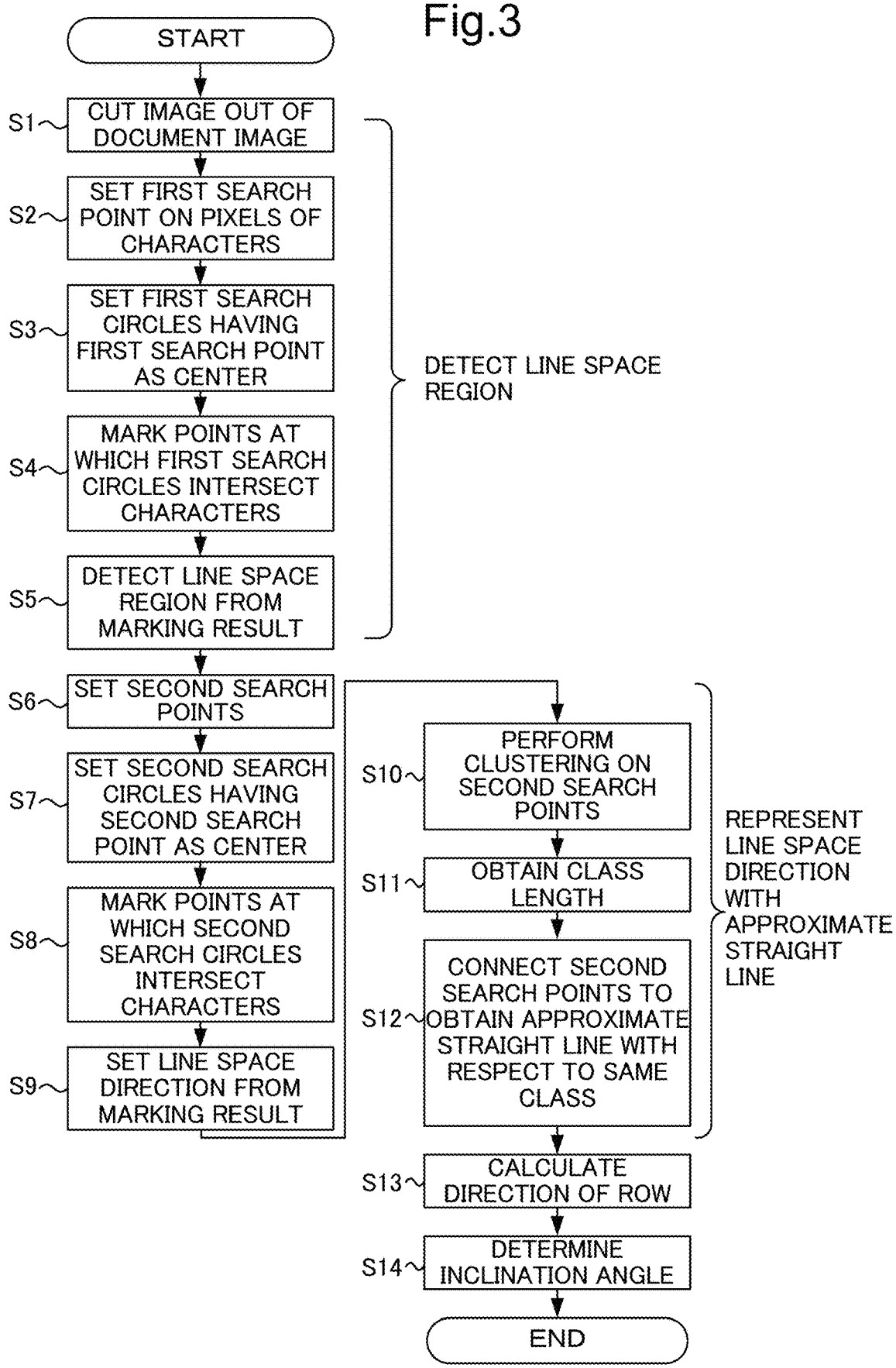
FIG. 3 is a flowchart showing a flow of image inclination angle detection processing.

Next, a processing operation of the image inclination angle detection apparatus will be described with reference to the drawings. FIG. 3 is a flowchart showing a flow of image inclination angle detection processing. First, the image cutting device 11 cuts an image having a predetermined size out of an image represented by image data acquired by the image reading device 91 through document reading as a cut image (step S1).

Figure 4:
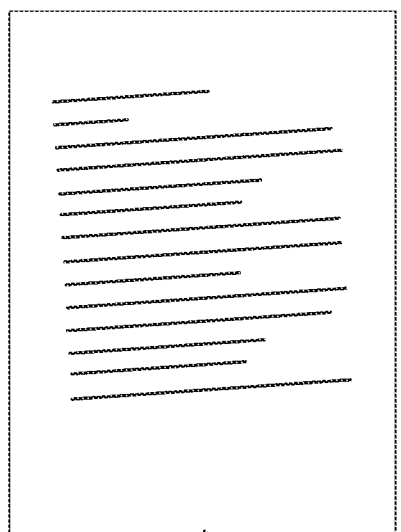
FIG. 4 is a diagram showing an original image and a cut image.
Figure 4:
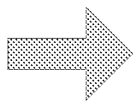

FIG. 4 is a diagram for explaining step S1. For example, when a user sets a document slantwise on a document loading stand of the image reading device 91, the image reading device 91 reads the slanted document as it is.

Accordingly, a document image 50 represented by image data acquired by the image reading device 91 is slanted, as shown in FIG. 4.

Accordingly, the image cutting device 11 cuts an image having a predetermined size (e.g., a size of an area of a quarter of the entire document image 50) out of the document image 50 and acquires the image as a cut image 51. It is desirable that the image cutting device 11 use a region having many characters (e.g., a region having a high pixel density) as the cut image 51 from the document image 50.

Then, the first search point setting device 12 selects a plurality of characters on which first search points will be set from characters included in the cut image 51 and sets the first search points on pixels of the selected plurality of characters (step S2).

Figure 5:
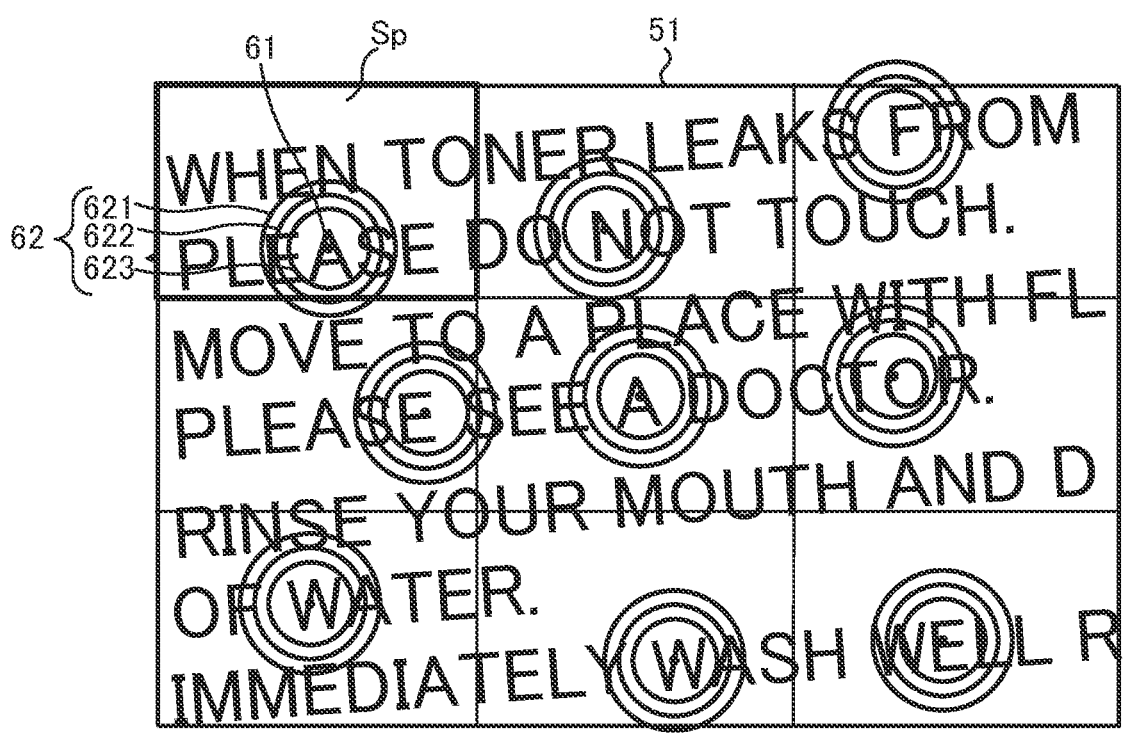
FIG. 5 is a diagram showing a plurality of characters on which first search points are to be set and the first search points.

FIG. 5 is a diagram for explaining step S2. The first search point setting device 12 detects a plurality of characters from the cut image 51, for example, using an optical character recognition (OCR) function and selects a plurality of characters on which first search points will be set from the detected plurality of characters. For example, the first search point setting device 12 divides the cut image 51 into a predetermined number of regions (equally divide the cut image 51 into 9 regions in the case of FIG. 5) and select one character from each section in order to uniformly select characters on which first search points will be set. The first search point setting device 12 sets a first search point on each character selected in this manner. FIG. 5 shows an example in which a first search point 61 is set on a character "A" in a section Sp which is a section.

Subsequently, the first search frame generator 13 sets a plurality of first search circles with different diameters having a first search point as a center with respect to each first search point set as described above (step S3). This is described using FIG. 5. The first search frame generator 13 sets first search circles 621, 622 and 623 (hereinafter collectively referred to as a "first search circle 62") with different diameters having the first search point 61 as a center. In this manner, the first search frame generator 13 generates a first search frame composed of a corresponding first search point and a plurality of corresponding first search circles for each first search point by setting a plurality of first search circles with respect to each first search point.

For example, the smallest first search circle 623 has a diameter that is 1.4 times the font size of a character on which the first search point 61 is placed ("A" in the case of the region Sp of FIG. 5) and the largest first search circle 621 has a diameter that is about 3 times the font size of the character on which the first search point 61 is placed. This is for the purpose of causing the smallest first search circle 623 not to intersect the character ("A") on which the first search point 61 is placed and causing the largest first search circle 621 to intersect characters on both sides ("E" and "S") and a character ("E" and "N") with a space between it and the character ("A") on which the first search point 61 is placed.

Figure 6:
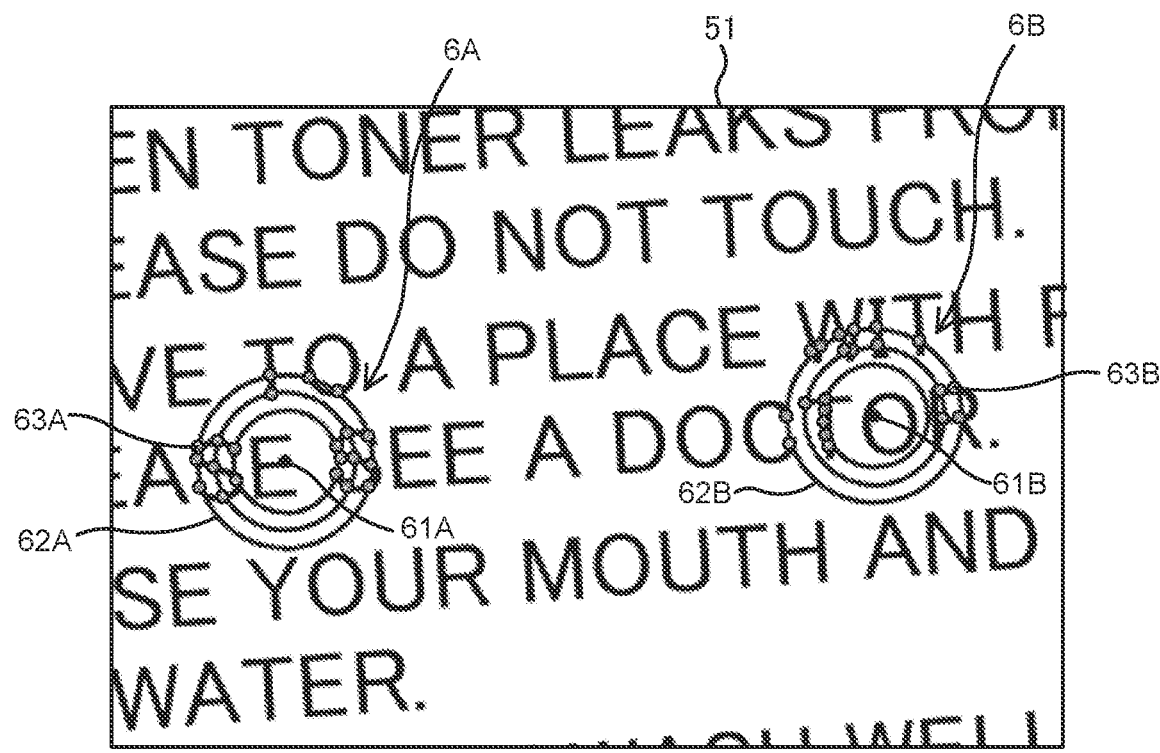
FIG. 6 is a diagram showing a state in which first marks have been attached to positions at which characters and first search circles overlap.

Subsequently, the first marking device 14 attaches first marks to points at which all the first search circles 621, 622 and 623 intersect characters to mark the points (step S4). FIG. 6 is a diagram for explaining step S4. Hereinafter, description will be given using a first search point 61A and a first search point 61B with respect to two first search frames 6A and 6B, and a first search circle group 62A and a second search circle group 62B having these points as centers in order to make it easier to view the drawing. Meanwhile, processing described below is actually performed on all first search circles shown in FIG. 5.

The first marking device 14 attaches first marks 63A to intersection points of the first search circle 62A and overlapping characters ("T", "O", "S", and "S"). Further, the first marking device 14 attaches first marks 63B to intersection points of the first search circle 62B and overlapping characters ("W", "I", "T", "O", "T" and "R".

Subsequently, the line space region detector 15 extracts, with respect to respective first search circles in each first search frame, ranges having no first marks when viewed from the first search point, which is the center of the first search circles, in the form of fan shapes, obtains central angles of the ranges, and detects a range having a largest central angle from among the obtained central angles as a region present in a line space (step S5).

Figure 7:
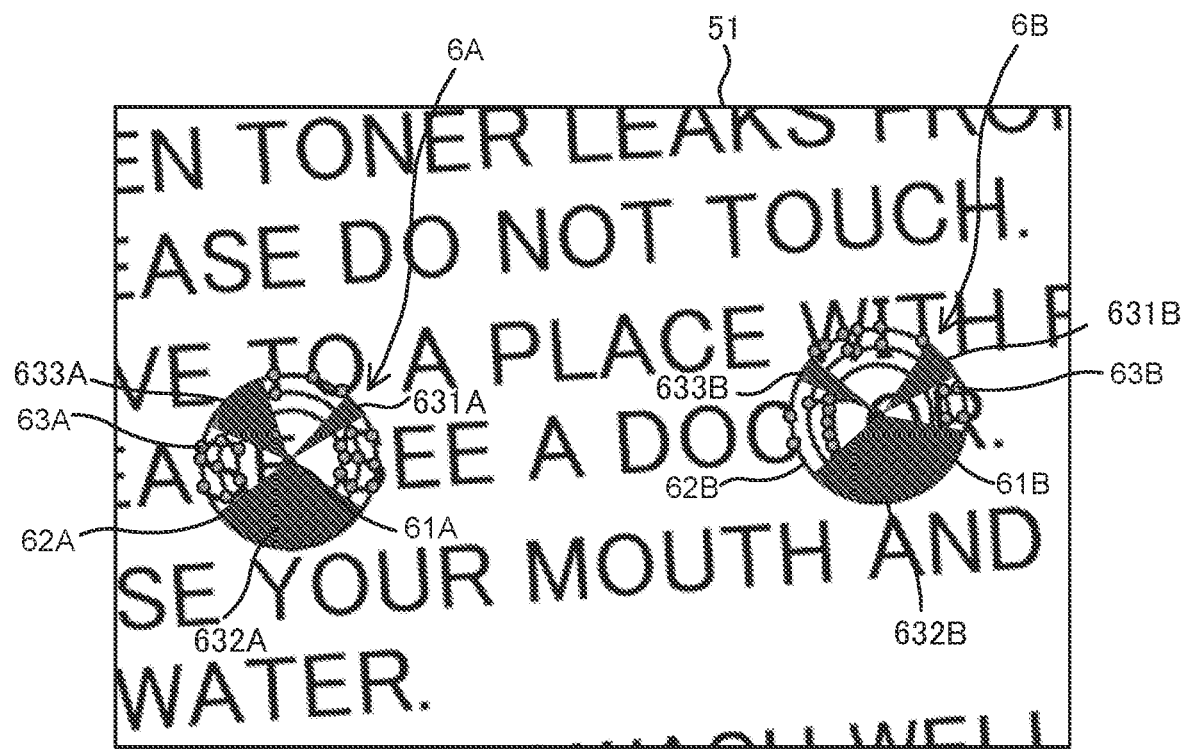
FIG. 7 is a diagram showing a region in which there is a line space in a first search frame.

FIG. 7 is a diagram for explaining step S5. In the case of the first search frame 6A, the line space region detector 15 extracts regions 631A, 632A and 633A as ranges having no first marks 63A when viewed from the first search point 61A. In addition, in the case of the first search frame 6B, the line space region detector 15 extracts regions 631B, 632B and 633B as ranges having no first marks 63B.

Then, the line space region detector 15 selects a region having a largest central angle from among the extracted regions. The line space region detector 15 selects the region 632A in the case of the first search circle 62A. The line space region detector 15 selects the region 632B in the case of the first search circle 62B.

The regions 632A and 632B represent regions in a line space. That is, the line space region detector 15 detects line space regions that are placed in line spaces when viewed from characters on which first search points are placed.

Subsequently, the second search point setting device 16 sets a second search point on any of a plurality of first search circles in the line space region of each first search frame (step S6). The second search point setting device 16 stores the position of the set second search point (coordinates in an image).

Figure 8:
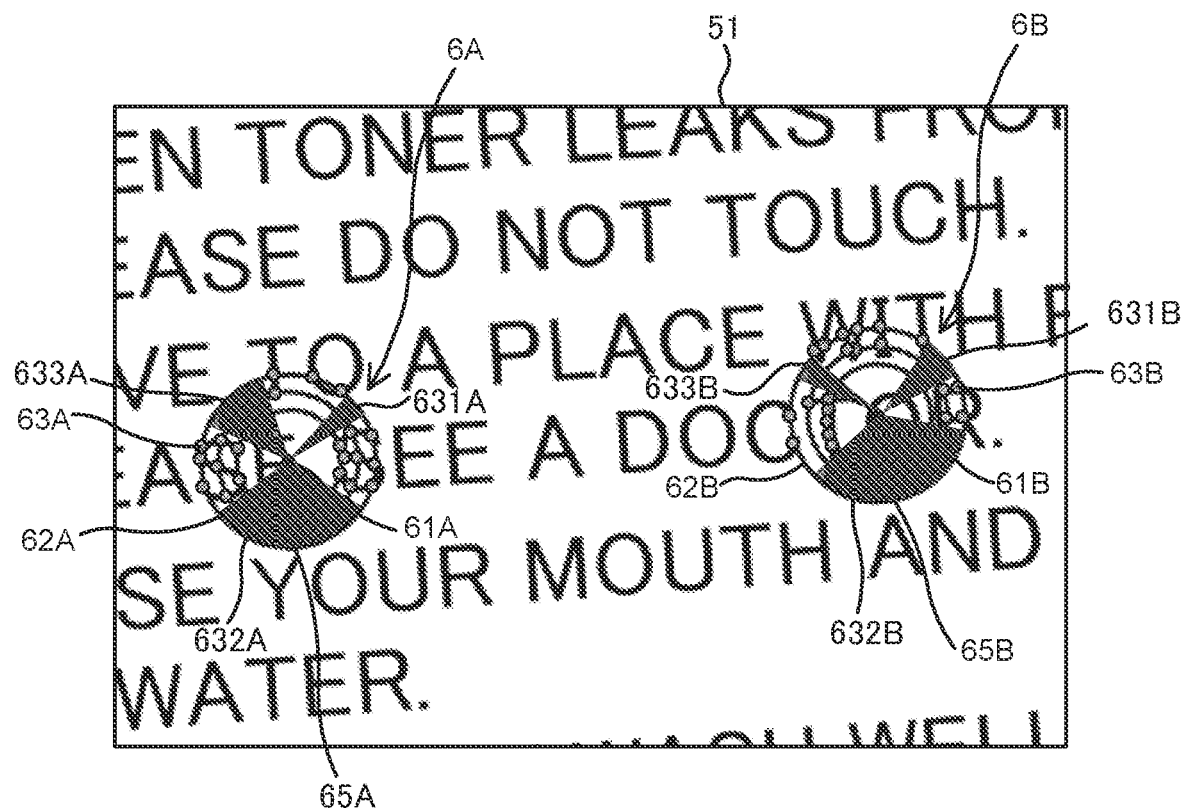
FIG. 8 is a diagram showing a state in which a second search point has been set in a line space region.

FIG. 8 is a diagram for explaining step S6. The second search point setting device 16 sets a second search point on any of a plurality of first search circles in a line space region detected by the line space region detector 15 in each first search frame. In the case of the present embodiment, the second search point setting device 16 sets second search points 65A and 65B on search circles having a second largest diameter which are placed near the centers of the region 632A and the region 632B.

Figure 9:
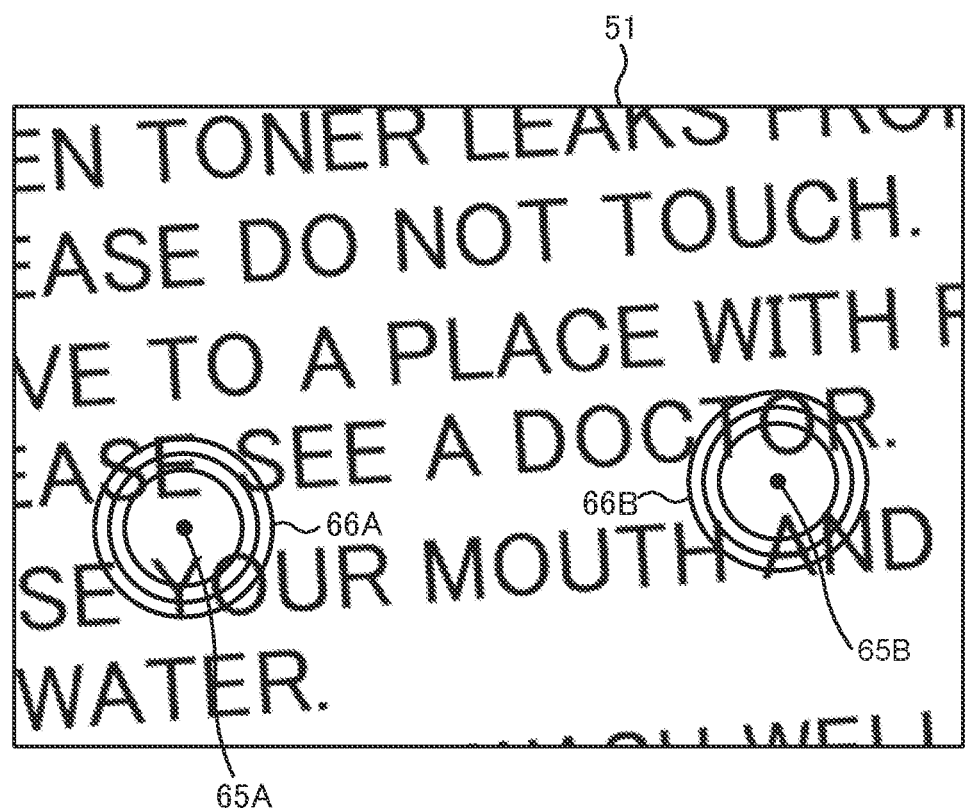
FIG. 9 is a diagram showing a state in which second search circles having the second search point as a center have been set.

Subsequently, the second search frame generator 17 sets, with respect to each second search point set as described above, a plurality of second search circles with different diameters having the second search point as a center (step S7). FIG. 9 shows an example in which the second search frame generator 17 sets groups 66A and 66B of three second search circles with different diameters having the second search points 65A and 65B as centers. Each second search circle has the same size as the first search circle 62 described in FIG. 5. In this manner, the second search frame generator 17 sets the aforementioned plurality of second search circles with respect to each second search point to generate a second search frame composed of the second search point and the plurality of second search circles for each second search point.

Figure 10:
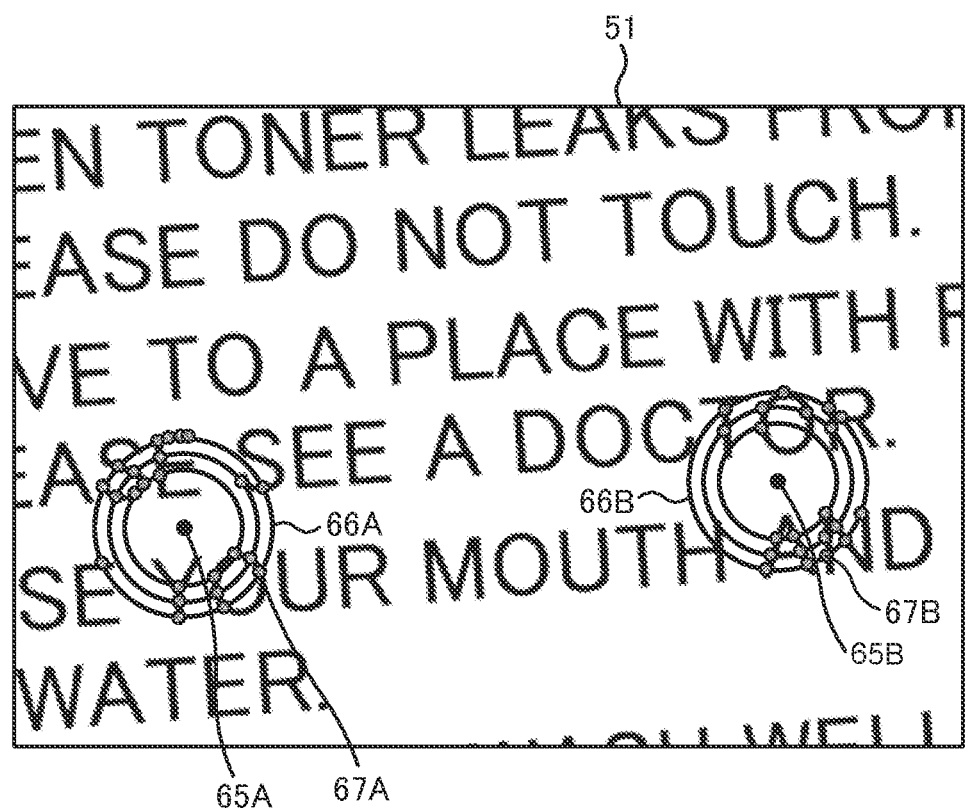
FIG. 10 is a diagram showing a state in which second marks have been attached to positions at which characters and second search circles overlap.

Subsequently, the second marking device 18 attaches second marks to points at which all second search circles intersect characters in each second search frame to mark the points (step S8). FIG. 10 is a diagram for explaining step S8. The second marking device 18 attaches second marks 67A to intersection points of the second search circle 66A and overlapping characters ("S", "E", "S", "E", "Y" and "O"). Further, the second marking device 18 attaches second marks 67B to intersection points of the second search circle 66B and overlapping characters ("T", "O", "R", "A" and "N").

Figure 11:
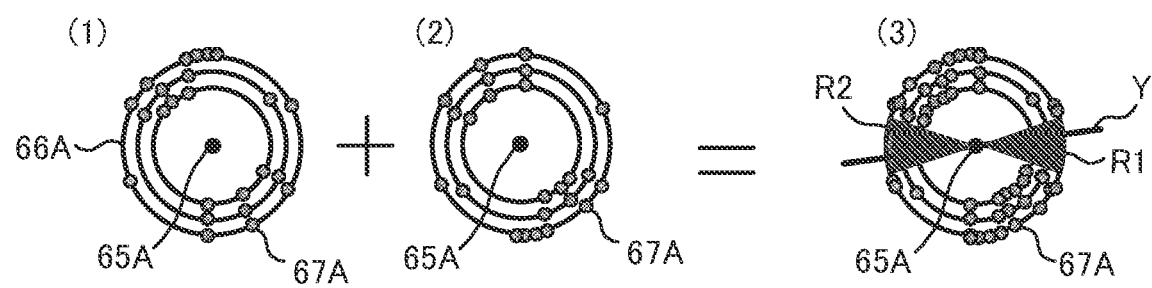
FIG. 11 is a diagram showing a state in which a line space direction is set.

Subsequently, in each second search frame generated as described above, the line space direction setting device 19 extracts, in the form of fan shapes, ranges having no second marks when viewed from the second search point, which is the center of the second search circles, and sets, as a line space direction, a direction in which a straight line passing through the center portions of the ranges and the second search point extends. For example, the line space direction setting device 19 superposes second marks on marks obtained by rotating the second marks 180° having the second search point as a center, as shown in FIG. 11. Then, with respect to the superposed marks, the line space direction setting device 19 extracts, in the form of fan shapes, ranges having no second marks when viewed from the second search point, which is the center and sets, as a line space direction, a straight line connecting the extracted ranges and the second search point (step S9).

FIG. 11 is a diagram for explaining step S9. The line space direction setting device 19 180° rotates second marks 67A ((1) in FIG. 11) on the second search circle 66A having the second search point 65A as a center to generate second marks 67A shown in (2).

Then, the line space direction setting device 19 superposes the second marks 67A shown in (2) on the second marks 67A shown in (1) to generate second marks 67A shown in (3). Further, the line space direction setting device 19 extracts regions R1 and R2 that are ranges having no second marks 67A when viewed from the second search point 65A with respect to (3). The line space direction setting device 19 sets a direction in which a straight line Y passing through the center portions of the regions R1 and R2 and the second search point 65A extends as a line space direction. Meanwhile, when there are three or more regions having no second marks 67A, the line space direction setting device 19 selects two regions at positions axially symmetrical to a straight line passing through the second search point 65A and sets a direction in which a straight line passing through the center portions of regions represented by the selected ranges and the second search point 65A extends as a line space direction.

Subsequently, the clustering device 20 performs clustering on second search points of respective second search frames using the positions of the second search points and a line space direction set by the line space direction setting device 19 (step S10). For example, by using a criterion that the position of a second search point is within a predetermined specific range in a direction perpendicular to the straight line passing through the second search point, the clustering device 20 performs clustering by which a plurality of second search points that satisfy the criterion is set as the same class. Meanwhile, the clustering device 20 acquires the position of each second search point from the second search point setting device 16.

Figure 12:
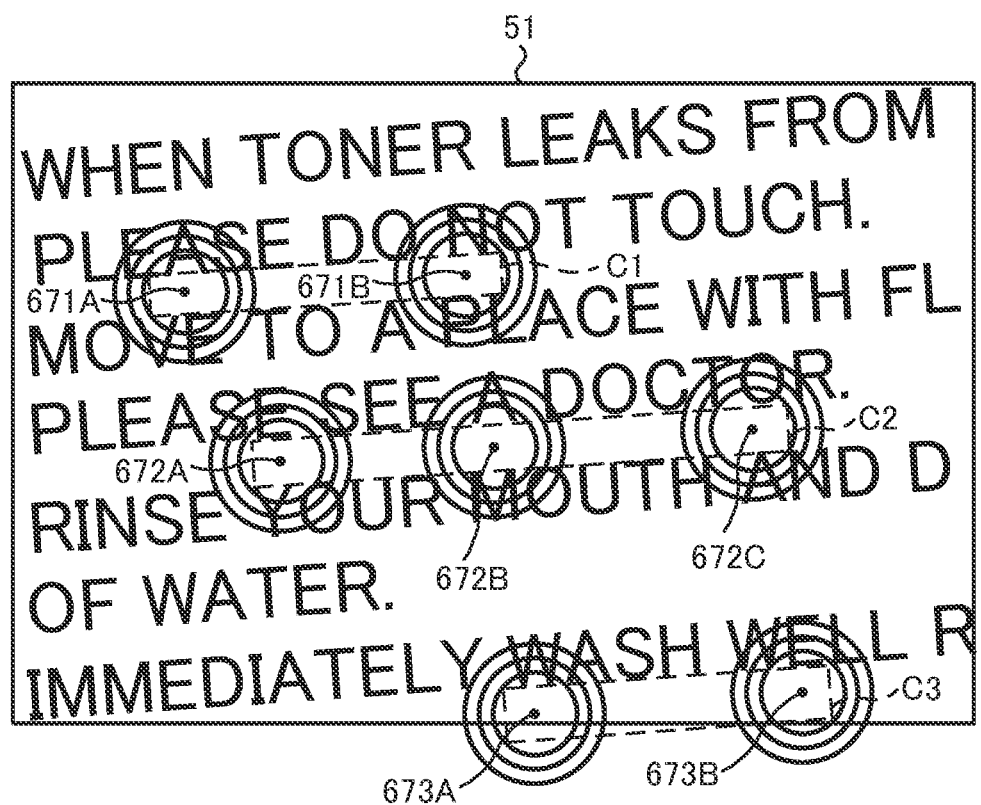
FIG. 12 is a diagram showing clustered second search points.

FIG. 12 is a diagram for explaining step S10. As shown in FIG. 12, the clustering device 20 performs clustering on second search points in the same line space on the basis of the line space direction set by the line space direction setting device 19 in a state in which second search points 671A and 671B are set to a class C1, second search points 672A, 672B, and 672C are set to a class C2, and second search points 673A, 673B, and 673C are set to a class C3 using the aforementioned criterion.

Subsequently, the class length calculator 21 selects two second search points farthest from each other in each class set by the clustering device 20, calculates a distance between the two points and sets the calculated distance as a class length (step S11).

Figure 13:
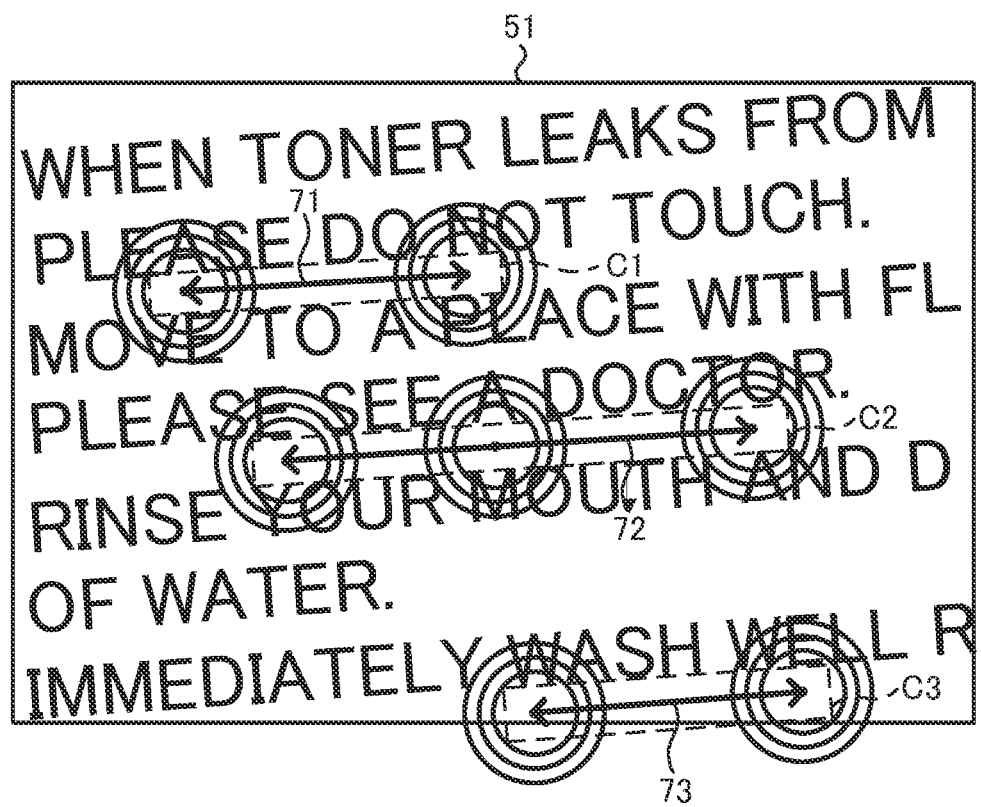
FIG. 13 is a diagram showing a state in which second search points farthest from each other in each class are selected.

FIG. 13 is a diagram for explaining step S11. In the case of the diagram shown in FIG. 13, the class length of the class C1 is the length of an arrow 71, the class length of the class C2 is the length of an arrow 72, and the class length of the class C3 is the length of an arrow 73.

Subsequently, the approximate straight line calculator 22 performs principal component analysis using coordinates of second search points for each class and obtains an approximate straight line corresponding to a line space direction (step S12).

Figure 14:
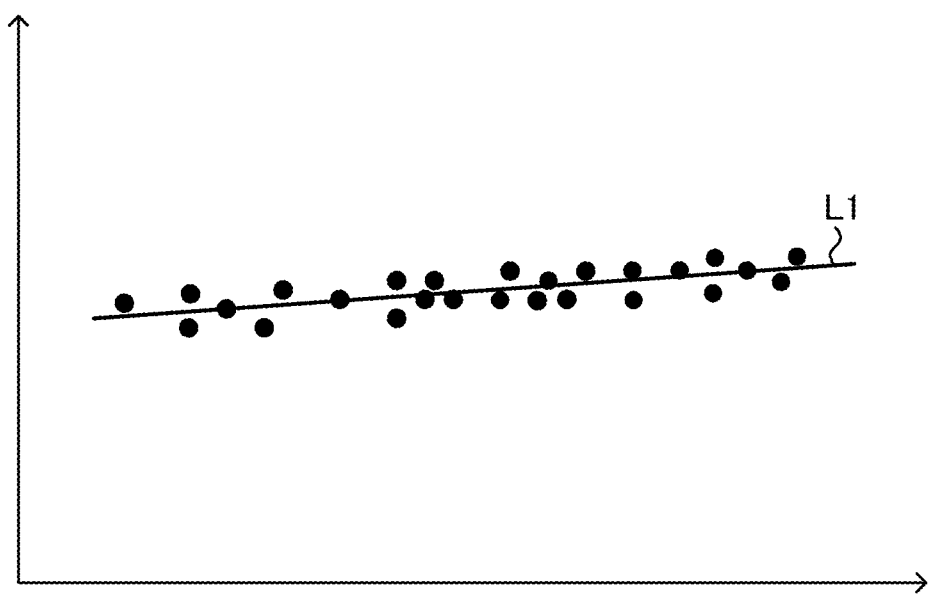
FIG. 14 is a diagram showing a straight line acquired by principal component analysis using an approximate straight line calculation device.
Figure 15:
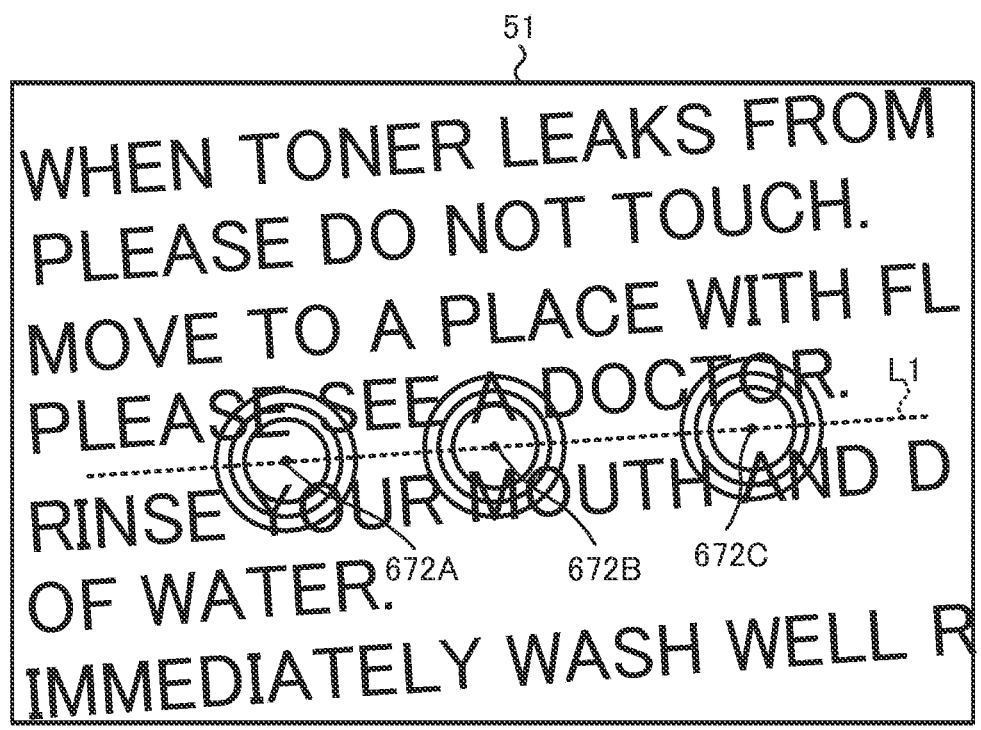
FIG. 15 is a diagram showing a state in which a straight line acquired by the principal component analysis has been disposed in a cut image.

FIG. 14 and FIG. 15 are diagrams for explaining step S12. The approximate straight line calculator 22 performs principal component analysis using coordinates of all second search points of the same class as inputs. The approximate straight line calculator 22 uses a known analysis method as principal component analysis. A straight line L1 in FIG. 14 is a straight line acquired through principal component analysis performed by the approximate straight line calculator 22 and an approximate straight line L1 represents the straight line L1 disposed in the cut image 51 shown in FIG. 15 using a dotted line on the basis of the coordinates of second search points.

Subsequently, the row direction calculator 23 performs principal component analysis using, as inputs, coordinates (positions) of all pixels constituting characters overlapping with second search circles from among a plurality of characters positioned immediately above the approximate straight line obtained in step S12. Accordingly, a straight line indicating a direction of a row composed of characters positioned immediately above the approximate straight line is obtained. Further, the row direction calculator 23 performs principal component analysis using, as inputs, coordinates of all pixels constituting characters overlapping with the second search circles from among a plurality of characters positioned immediately below the approximate straight line obtained in step S12. Accordingly, a straight line indicating a direction of a row composed of characters positioned immediately below the approximate straight line is obtained (step S13).

Figure 16:
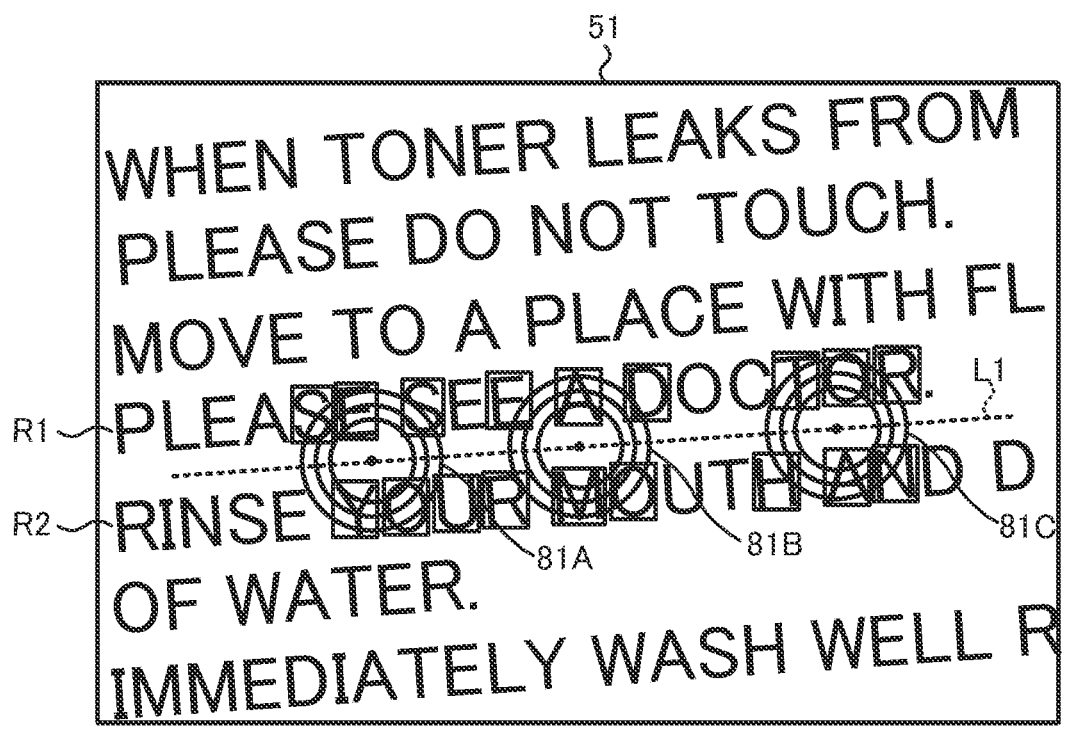
FIG. 16 is a diagram showing a plurality of characters which are positioned immediately above and immediately below an approximate straight line and overlap with the second search circles.

FIG. 16 is a diagram for explaining step S13. The row direction calculator 23 performs principal component analysis with respect to all pixels constituting characters (characters enclosed surrounded by squares: "S", "E", "S", "E", "A", "D", "T", "O" and "R") overlapping with second search circles 81A, 81B and 81C from among characters included in a row R1 positioned immediately above the approximate straight line L1. A straight line obtained in this manner is a straight line L101 shown in FIG. 17.

Figure 17:
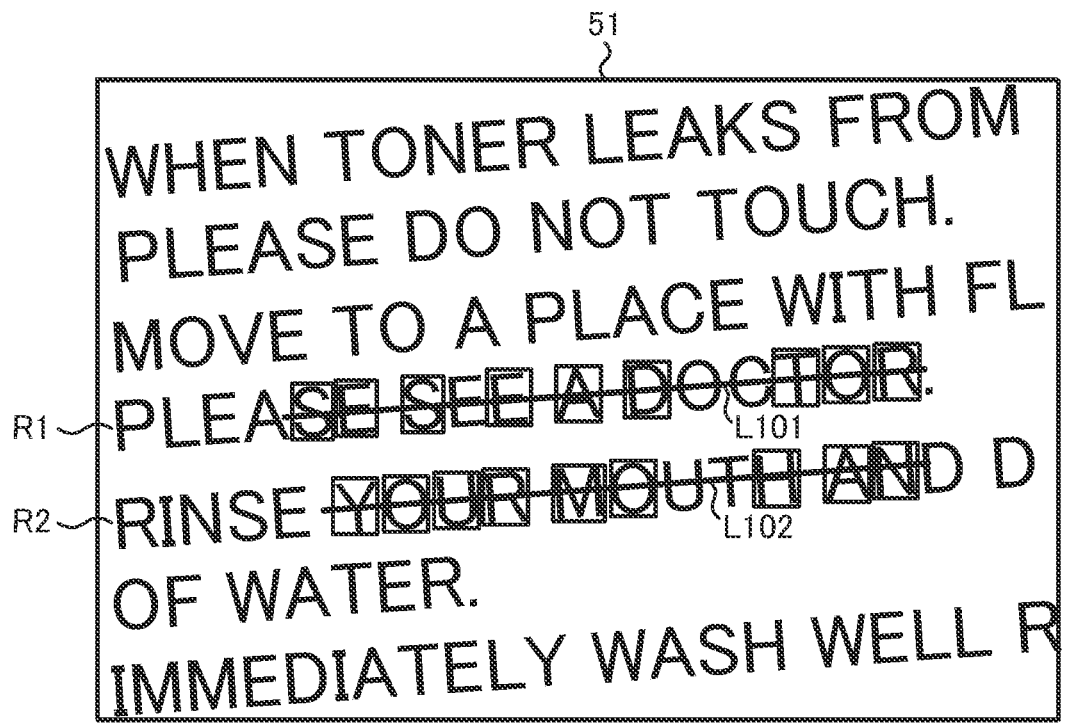
FIG. 17 is a diagram showing straight lines acquired by the principal component analysis using coordinates of all pixels constituting characters overlapping with the second search circles as inputs.

Further, the row direction calculator 23 performs principal component analysis with respect to all pixels constituting characters ("Y", "O", "U", "R", "M", "O", "H", "A" and "N") overlapping with the second search circles 81A, 81B and 81C from among characters included in a row R2 positioned immediately below the approximate straight line L1. A straight line obtained through this principal component analysis is a straight line L102 shown in FIG. 17. In FIG. 17, the straight line L101 indicates a direction in which the row R1 extends and the straight line L102 indicates a direction in which the row R2 extends.

Subsequently, the inclination angle determination device 24 calculates inclinations of the straight lines indicating the directions of the rows obtained in step S13, that is, inclinations of the straight lines indicating the directions of the rows obtained in step S13 with respect to each side of two vertical sides and two horizontal side of the document image 50 acquired through reading performed by the image reading device 91 and determines an inclination angle of the image read by the image reading device 91 with respect to the document on the basis of an inclination with respect to any of two sides for which the inclinations are minimized (step S14). FIG. 18 is a diagram showing information on each straight line obtained in step S13.

A method of determining an inclination angle of an image read by the image reading device 91 will be described in detail.

(1) First, the inclination angle determination device 24 obtains inclinations of the straight lines indicating the directions of the rows obtained in step S13 and calculates an average of the inclinations of the straight lines with respect to the rows. Further, the inclination angle determination device 24 excludes inclinations of straight lines differing from the average by a predetermined value or more from data. The inclination angle determination device 24 improves the accuracy of the obtained inclination angle of the image by excluding inclinations greatly deviating from an expectation value.

(2) Subsequently, the inclination angle determination device 24 sequentially extracts a predetermined specific number of inclinations from inclinations of straight lines obtained with a class having a long class length with respect to inclinations of straight lines indicating directions of rows which remain after the exclusion. It may be conceived that an error between an inclination of a straight line obtained by the line space direction calculator 23 and an actual inclination decreases as a class length increases. Therefore, it is possible to improve the accuracy of an obtained inclination angle by considering an inclination of a straight line obtained with a class having a long class length.

(3) Finally, the inclination angle determination device 24 calculates, with respect to inclinations of straight lines extracted in (2), a weighted average by increasing a degree of importance for classes including the straight lines and having longer class lengths and sets the calculation result as an inclination angle of the image read by the image reading device 91.

<3. Experimental Results>

Figure 19:
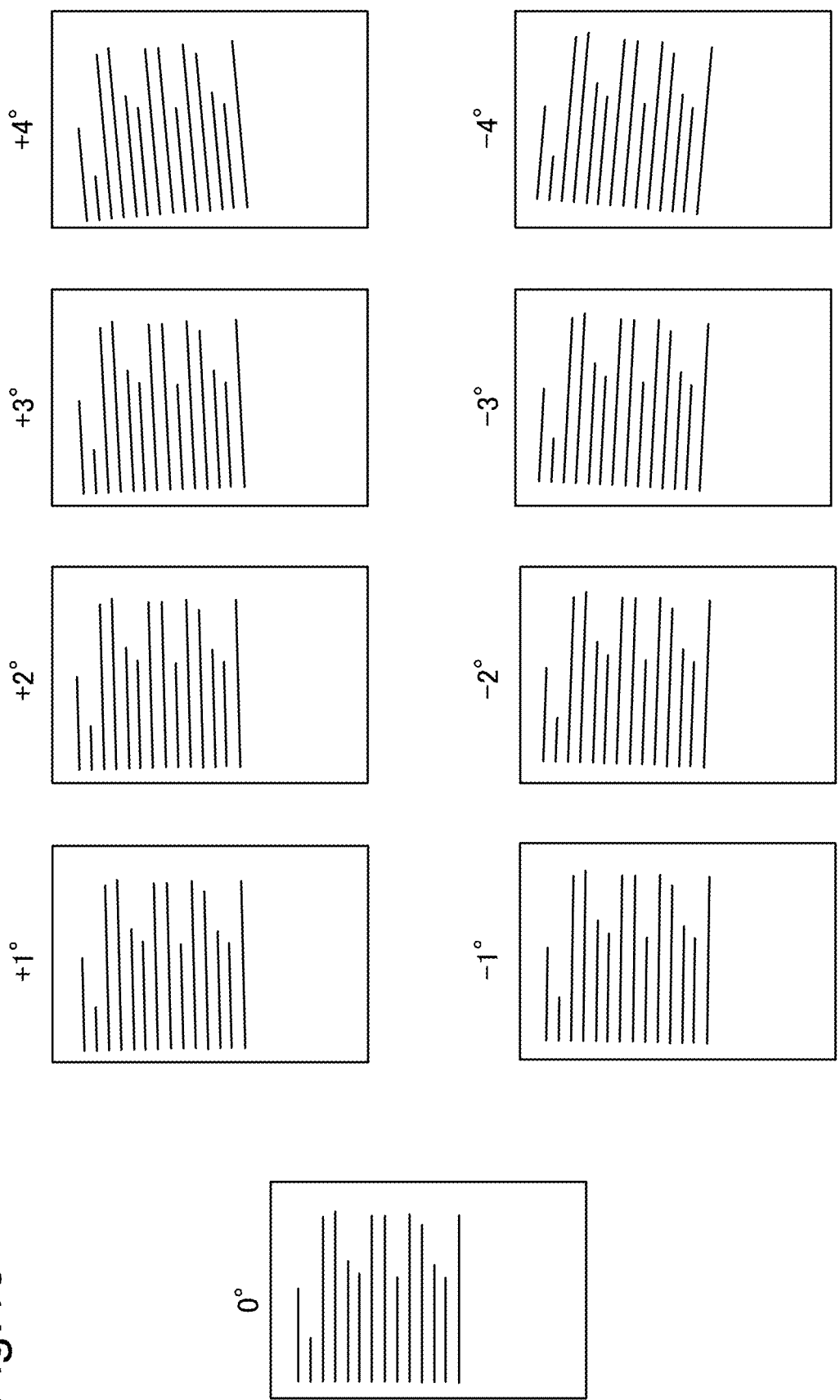
FIG. 19 is a diagram showing document images when an image reading device is caused to read a document while the document is inclined at intervals of 1° in the range of −4° to +4°.

A document was actually slanted and read and then an inclination angle of an image read by the image reading device 91 was calculated using the above-described method. FIG. 19 shows document images when read by the image reading device 91 while being inclined at intervals of 1° in the range of −4° to +4°. An inclination angle is plus (+) counterclockwise and minus (−) clockwise.

FIG. 20 shows results of inclination angles of images obtained from document images using the above-described method. A total of six types of English materials (English text 1 to 3) and Japanese materials (Japanese text 1 to 3) were used as documents. Errors between actual inclination angles and calculation results are within −0.2° to +0.2° in any material and thus it can be ascertained that inclination angles of the images can be obtained with high accuracy.

In addition, it can be ascertained that inclination angles can be detected with high accuracy even when characters included in a document is characters having different heights and widths, such as the alphabet.

Furthermore, when a document is placed on the image reading device 91, even if the direction of the document was rotated 90° and the document was additionally slanted about +4°, set and read, inclination angles of the images have been calculated with sufficient high accuracy. Accordingly, it is possible to calculate a correct inclination angle irrespective of the direction of a document.

However, since edge information on the upper end of each character is used in the above-described first general method, accuracy decreases when characters having different heights, such as the alphabet, are processed. Furthermore, accuracy decreases when characters are arranged in vertical typesetting because the minimum squares method is used for an estimation means.

Moreover, although processing is performed in the order of expansion, thinning and edge extraction and an inclination angle is estimated from extracted edges in the above-described second general method, information extracted through this procedure is only pixels of outmost portions of characters and shapes of characters affect estimation accuracy. Particularly, accuracy decreases in the case of characters having different heights, such as the alphabet.

<4. Effects>

On the other hand, according to the above-described embodiment, it is possible to obtain an inclination angle of an image read by the image reading device 91 with higher accuracy than those of conventional methods. In addition, even when the image reading device 91 reads a slanted document, an image in a correct direction can be acquired by obtaining an inclination angle of the image from an acquired document image and performing image correction. Further, the image can be printed in the correct direction when the image forming device 92 prints the image on paper.

Meanwhile, the present disclosure is not limited to the configurations of the above-described embodiment and can be modified in various manners. In addition, the configurations and processing of the above-described embodiment described using FIG. 1 to FIG. 20 are merely an example of the present disclosure and the present disclosure is not limited to the configurations and processing.

While the present disclosure has been described in detail with reference to the embodiments thereof, it would be apparent to those skilled in the art the various changes and modifications may be made therein within the scope defined by the appended claims.

What is claimed is:

1. An image inclination angle detection apparatus comprising:
    an image reading device that reads an image of a document; and
    a control device that includes a processor and functions as, through the processor executing an image inclination angle detection program:
        a first search point setting device that detects a plurality of characters included in the image acquired through document reading performed by the image reading device and sets a first search point at a point on each of the characters;
        a first search frame generator that sets, with respect to each first search point set by the first search point setting device, a plurality of first search circles with different diameters having the first search point as a center and generates a first search frame composed of the first search point, which is the center of the plurality of first search circles, and the plurality of first search circles;
        a first marking device that attaches first marks to points at which the plurality of first search circles intersect the characters included in the image in each first search frame generated by the first search frame generator;

a line space region detector that extracts, in each first search frame, ranges having no first marks when viewed from the first search point, which is the center of the first search circles, in the form of fan shapes and detects a range having a largest central angle as a region present in a line space;

a second search point setting device that sets second search points on any of the plurality of first search circles in the region detected by the line space region detector in each first search frame;

a second search frame generator that sets, with respect to each second search point set by the second search point setting device, a plurality of second search circles with different diameters having the second search point as a center and generates a second search frame composed of the second search point and the plurality of second search circles;

a second marking device that attaches second marks to points at which the second search circles intersect the characters included in the image in each second search frame generated by the second search frame generator;

a line space direction setting device that extracts, in each second search frame, ranges having no second marks when viewed from the second search point, which is the center of the plurality of second search circles, in the form of fan shapes and sets, as a line space direction, a direction in which a straight line passing through the center portions of the ranges and the second search point extends;

a clustering device that performs clustering by which the second search points of the second search frames arranged in the line space direction set by the line space direction setting device are set as a same class;

an approximate straight line calculator that calculates, for each class set by the clustering device, an approximate straight line connecting the second search points of the second search frames in the class;

a row direction calculator that, for each approximate line calculated by the approximate straight line calculator, obtains, based on positions of all pixels of characters overlapping with the second search circles from among a plurality of characters positioned immediately above the approximate line, a straight line indicating a direction of a row composed of the plurality of characters positioned immediately above the approximate line and further obtains, based on positions of all pixels of characters overlapping with the second search circles from among a plurality of characters positioned immediately below the approximate line, a straight line indicating a direction of a row composed of the plurality of characters positioned immediately below the approximate line; and an inclination angle determination device that determines, from inclinations of respective straight lines indicating the directions of the rows calculated by the row direction calculator, an inclination angle of the image with respect to the document, the image being acquired through document reading performed by the image reading device.

2. The image inclination angle detection apparatus according to claim 1, wherein
the control device further functions as an image cutting device that cuts a region having many characters out of the image to acquire a cut image, and
the first search point setting device sets the first search points using the cut image as the image.

3. The image inclination angle detection apparatus according to claim 1, wherein the first search point setting device divides the image into a predetermined number of regions, selects a predetermined number of characters in each of the divided regions, and sets a point on the selected characters as the first search point.

4. The image inclination angle detection apparatus according to claim 1, wherein the first search frame generator sets the diameter of a smallest first search circle to about 1.4 times a size of a character near the first search point, which is the center of the first search circle, and sets the diameter of a largest first search circle to about 3 times the size of the character near the first search point.

5. The image inclination angle detection apparatus according to claim 1, wherein
the line space direction setting device
in each second search frame, superposes the second marks for each of the plurality of second search circles on second marks obtained by rotating the second marks 180° having the second search point as a center, and extracts ranges having no second marks when viewed from the second search point in the form of fan shapes in each second search frame, and
selects two ranges at positions axially symmetrical to a straight line passing through the second search point from the extracted ranges, and sets, as a line space direction, a direction in which a straight line passing through the center portions of the selected range and the second search point extends.

6. The image inclination angle detection apparatus according to claim 1, wherein the approximate straight line calculator obtains the approximate straight line by performing principal component analysis using coordinates of the second search points of the respective second search frames in the same class as inputs.

7. The image inclination angle detection apparatus according to claim 1, wherein the row direction calculator obtains a straight line indicating a direction of a row composed of a plurality of characters positioned immediately above the approximate line by performing principal component analysis using, as inputs, coordinates of all pixels of characters overlapping with the second search circles from among the plurality of characters positioned immediately above the approximate straight line and further obtains a straight line indicating a direction of a row composed of a plurality of characters positioned immediately below the approximate straight line by performing principal component analysis using, as inputs, coordinates of all pixels of characters overlapping with the second search circles from among the plurality of characters positioned immediately below the approximate straight line.

8. The image inclination angle detection apparatus according to claim 1, wherein the inclination angle determination device calculates an average of inclinations of straight lines calculated by the row direction calculator, excludes inclinations of straight lines differing from the average by a predetermined value or more, and determines the inclination angle of inclination of the image with respect to the document, the image being acquired through document reading performed by the image reading device.

9. The image inclination angle detection apparatus according to claim 1, wherein
the control device further functions as a class length calculator that calculates, with respect to second search points of two second search frames farthest from each other, a distance between the second search points as a class length with respect to the same class, and the inclination angle determination device sequentially extracts, with respect to inclinations of straight lines calculated by the row direction calculator, a specific number of inclinations from the inclinations of the straight lines calculated with a class having a long class length and determines, from the extracted inclinations, the inclination angle of the image with respect to the document, the image being acquired through document reading performed by the image reading device.

10. The image inclination angle detection apparatus according to claim 9, wherein the inclination angle determination device calculates, with respect to the extracted inclinations of the straight lines, a weighted average by increasing a degree of importance for a class having a longer class length to which the straight lines belong, and sets a calculation result as the inclination angle of inclination of the image with respect to the document, the image being acquired through document reading performed by the image reading device.

11. The image inclination angle detection apparatus according to claim 1, wherein the control device further functions as a corrector that acquires the inclination angle determined by the inclination angle determination device and uses the acquired inclination angle to correct inclination of the image acquired through document reading performed by the image reading device.

12. An image forming apparatus comprising:
the image inclination angle detection apparatus according to claim 1; and
an image forming device that performs image formation on a recording medium using an image read by the image reading device.

13. A computer-readable non-transitory recording medium storing an image inclination angle detection program causing a computer to function as:
a first search point setting device that detects a plurality of characters included in an image acquired through document reading performed by an image reading device and sets a first search point at a point on each of the characters;
a first search frame generator that sets, with respect to each first search point set by the first search point setting device, a plurality of first search circles with different diameters having the first search point as a center and generates a first search frame composed of the first search point, which is the center of the plurality of first search circles, and the plurality of first search circles;
a first marking device that attaches first marks to points at which the plurality of first search circles intersect the characters included in the image in each first search frame generated by the first search frame generator;
a line space region detector that extracts, in each first search frame, ranges having no first marks when viewed from the first search point, which is the center of the first search circles, in the form of fan shapes and detects a range having a largest central angle as a region present in a line space;
a second search point setting device that sets second search points on any of the plurality of first search circles in the region detected by the line space region detector in each first search frame;
a second search frame generator that sets, with respect to each second search point set by the second search point setting device, a plurality of second search circles with different diameters having the second search point as a center and generates a second search frame composed of the second search point and the plurality of second search circles;
a second marking device that attaches second marks to points at which the second search circles intersect the characters included in the image in each second search frame generated by the second search frame generator;
a line space direction setting device that extracts, in each second search frame, ranges having no second marks when viewed from the second search point, which is the center of the plurality of second search circles, in the form of fan shapes and sets, as a line space direction, a direction in which a straight line passing through the center portions of the ranges and the second search point extends;
a clustering device that performs clustering by which the second search points of the second search frames arranged in the line space direction set by the line space direction setting device are set as a same class;
an approximate straight line calculator that calculates, for each class set by the clustering device, an approximate straight line connecting the second search points of the second search frames in the class;
a row direction calculator that, for each approximate line calculated by the approximate straight line calculator, obtains, based on positions of all pixels of characters overlapping with the second search circles from among a plurality of characters positioned immediately above the approximate line, a straight line indicating a direction of a row composed of the plurality of characters positioned immediately above the approximate line and further obtains, based on positions of all pixels of characters overlapping with the second search circles from among a plurality of characters positioned immediately below the approximate line, a straight line indicating a direction of a row composed of the plurality of characters positioned immediately below the approximate line; and
an inclination angle determination device that determines, from inclinations of respective straight lines indicating the directions of the rows calculated by the row direction calculator, an inclination angle of the image with respect to the document, the image being acquired through document reading performed by the image reading device.

* * * * *